(12) United States Patent
Robertson

(10) Patent No.: US 8,859,119 B2
(45) Date of Patent: Oct. 14, 2014

(54) HEATING SYSTEM FOR A BATTERY MODULE AND METHOD OF HEATING THE BATTERY MODULE

(75) Inventor: David C. Robertson, Chicago, IL (US)

(73) Assignee: LG Chem, Ltd., Seoul (KR)

( * ) Notice: Subject to any disclaimer, the term of this patent is extended or adjusted under 35 U.S.C. 154(b) by 541 days.

(21) Appl. No.: 13/173,263

(22) Filed: Jun. 30, 2011

(65) Prior Publication Data

US 2013/0004802 A1    Jan. 3, 2013

(51) Int. Cl.

| | |
|---|---|
| *H01M 10/44* | (2006.01) |
| *H01M 10/6563* | (2014.01) |
| *H01M 10/6571* | (2014.01) |
| *H01M 10/633* | (2014.01) |
| *H01M 10/615* | (2014.01) |
| *H01M 10/052* | (2010.01) |

(52) U.S. Cl.
CPC ...... *H01M 10/5006* (2013.01); *H01M 10/5067* (2013.01); *H01M 10/5083* (2013.01); *H01M 10/5022* (2013.01); *H01M 10/052* (2013.01); *Y02T 10/7011* (2013.01)
USPC ............................................ 429/50

(58) Field of Classification Search
USPC ........................................ 429/50
See application file for complete search history.

(56) References Cited

U.S. PATENT DOCUMENTS

| | | |
|---|---|---|
| 4,390,841 A | 6/1983 | Martin et al. |
| 5,578,915 A | 11/1996 | Crouch, Jr. et al. |
| 5,606,242 A | 2/1997 | Hull et al. |
| 5,644,212 A | 7/1997 | Takahashi |
| 5,652,502 A | 7/1997 | van Phuoc et al. |
| 5,658,682 A | 8/1997 | Usuda et al. |
| 5,694,335 A | 12/1997 | Hollenberg |
| 5,701,068 A | 12/1997 | Baer et al. |
| 5,714,866 A | 2/1998 | S et al. |
| 5,739,670 A | 4/1998 | Brost et al. |
| 5,796,239 A | 8/1998 | van Phuoc et al. |
| 5,825,155 A | 10/1998 | Ito et al. |

(Continued)

FOREIGN PATENT DOCUMENTS

| | | | |
|---|---|---|---|
| JP | 9243716 A | 9/1997 | |
| JP | 9312901 A | 12/1997 | |

(Continued)

OTHER PUBLICATIONS

International Search Report dated Jul. 25, 2005 for International Application No. PCT/KR2004/003103.

(Continued)

*Primary Examiner* — Ula C. Ruddock
*Assistant Examiner* — Jacob Marks
(74) *Attorney, Agent, or Firm* — Buckert Patent & Trademark Law Firm, P.C.; John F. Buckert

(57) ABSTRACT

A heating system and a method for heating a battery module are provided. The method includes generating a temperature signal indicative of a temperature level of at least one of a first battery cell group and a second battery cell group. If a temperature level is less than the threshold temperature level, then the method further includes generating first and second control signals to induce first and second switches, respectively, to each have a first operational position to at least partially discharge the first and second battery cell groups, respectively, through first and second resistors, respectively, to generate heat energy in the first and second resistors.

12 Claims, 3 Drawing Sheets

(56) References Cited

U.S. PATENT DOCUMENTS

| | | | |
|---|---|---|---|
| 5,936,385 A | 8/1999 | Patillon et al. | |
| 6,016,047 A | 1/2000 | Notten et al. | |
| 6,064,180 A | 5/2000 | Sullivan et al. | |
| 6,160,376 A | 12/2000 | Kumar et al. | |
| 6,232,744 B1 | 5/2001 | Kawai et al. | |
| 6,285,163 B1 | 9/2001 | Watanabe et al. | |
| 6,329,823 B2 | 12/2001 | Blessing et al. | |
| 6,353,815 B1 | 3/2002 | Vilim et al. | |
| 6,359,419 B1 | 3/2002 | Verbrugge et al. | |
| 6,362,598 B2 | 3/2002 | Laig-Horstebrock et al. | |
| 6,441,586 B1 | 8/2002 | Tate, Jr. et al. | |
| 6,515,454 B2 | 2/2003 | Schoch | |
| 6,534,954 B1 | 3/2003 | Plett | |
| 6,563,318 B2 | 5/2003 | Kawakami et al. | |
| 6,583,606 B2 | 6/2003 | Koike et al. | |
| 6,608,482 B2 | 8/2003 | Sakai et al. | |
| 6,646,421 B2 | 11/2003 | Kimura et al. | |
| 6,661,201 B2 | 12/2003 | Ueda et al. | |
| 6,724,172 B2 | 4/2004 | Koo | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,892,148 B2 | 5/2005 | Barsoukov et al. | |
| 6,919,952 B2 | 7/2005 | Kruit | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,984,961 B2 | 1/2006 | Kadouchi et al. | |
| 7,012,434 B2 | 3/2006 | Koch | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,136,762 B2 | 11/2006 | Ono | |
| 7,138,775 B2 | 11/2006 | Sugimoto et al. | |
| 7,197,487 B2 | 3/2007 | Hansen et al. | |
| 7,199,557 B2 | 4/2007 | Anbuky et al. | |
| 7,233,128 B2 | 6/2007 | Brost et al. | |
| 7,250,741 B2 | 7/2007 | Koo et al. | |
| 7,253,587 B2 | 8/2007 | Meissner | |
| 7,315,789 B2 | 1/2008 | Plett | |
| 7,317,300 B2 | 1/2008 | Sada et al. | |
| 7,321,220 B2 | 1/2008 | Plett | |
| 7,327,147 B2 | 2/2008 | Koch | |
| 7,400,115 B2 | 7/2008 | Plett | |
| 7,424,663 B2 | 9/2008 | Mehalel | |
| 7,446,504 B2 | 11/2008 | Plett | |
| 7,518,339 B2 | 4/2009 | Schoch | |
| 7,521,895 B2 | 4/2009 | Plett | |
| 7,525,285 B2 | 4/2009 | Plett | |
| 7,583,059 B2 | 9/2009 | Cho | |
| 7,589,532 B2 | 9/2009 | Plett | |
| 7,593,821 B2 | 9/2009 | Plett | |
| 7,893,694 B2 | 2/2011 | Plett | |
| 2003/0015993 A1 | 1/2003 | Misra et al. | |
| 2003/0162084 A1* | 8/2003 | Shigeta et al. | 429/62 |
| 2003/0184307 A1 | 10/2003 | Kozlowski et al. | |
| 2005/0100786 A1 | 5/2005 | Ryu et al. | |
| 2005/0127874 A1 | 6/2005 | Lim et al. | |
| 2006/0100833 A1 | 5/2006 | Plett | |
| 2007/0120533 A1 | 5/2007 | Plett | |
| 2008/0094035 A1 | 4/2008 | Plett | |
| 2008/0213652 A1* | 9/2008 | Scheucher | 429/62 |
| 2008/0249725 A1 | 10/2008 | Plett | |
| 2009/0327540 A1 | 12/2009 | Robertson et al. | |

FOREIGN PATENT DOCUMENTS

| | | | |
|---|---|---|---|
| JP | 11003505 A | 1/1999 | |
| JP | 11023676 A | 1/1999 | |
| JP | 11032442 A | 2/1999 | |
| JP | 11038105 A | 2/1999 | |
| JP | 2002228730 A | 8/2002 | |
| JP | 2002319438 A | 10/2002 | |
| JP | 2002325373 A | 11/2002 | |
| JP | 2003516618 A | 5/2003 | |
| JP | 2003249271 A | 9/2003 | |
| JP | 2003257501 A | 9/2003 | |
| JP | 2004031014 A | 1/2004 | |
| JP | 2004521365 A | 7/2004 | |
| JP | 2006516326 A | 6/2009 | |
| JP | 2010-262879 | * 11/2010 | |
| KR | 19970024432 A | 5/1997 | |
| KR | 20020026428 A | 4/2002 | |
| WO | WO0067359 A1 | 11/2000 | |

OTHER PUBLICATIONS

International Search Report dated Mar. 31, 2005 for International Application No. PCT/KR2004/003332.

International Search Report dated Dec. 1, 2006 for International Application No. PCT/KR2006/003305.

S. Moore, P. Schneider; A review of Cell Equalization Methods for Lithium Ion and Lithium Polymer Battery Systems; 2001 Society of Automotive Engineers; Jan. 2001; pp. 1-5.

G. Plett; Advances in EKF SOC Estimation for LiPB HEV Battery Packs; Powering Sustainable Transportation EVS 20; Nov. 15-19, 2003; Long Beach, CA; pp. 1-12.

G. Welch, G. Bishop; An Introduction to the Kalman Filter; Siggraph 2001 Course 8; Los Angeles, CA; Aug. 12-17, 2001; http//info.acm.org/pubs/toc/CRnotice.html, pp. 1-80.

E. Wan, A. Nelson; Dual Extended Kalman Filter Methods; Kalman Filtering and Neural Networks; 2001; pp. 123-173.

Yon et al.; Dynamic Multidimensional Wavelet Neural Network and its Application; Journal of Advanced Computational Intelligence and Intelligent Informatics; 2000; vol. 4, No. 5; pp. 336-340.

Fletcher et al; Estimation from Lossy Sensor Data: Jump Linear Modeling and Kalman Filtering; IPSN Apr. 26-27, 2004; Berkeley, California; pp. 251-258.

G. Plett; Extended Kalman Filtering for Battery Managements System of LiPB-based HEV Battery Packs—Part 1 Background; Journal of Power Sources 134; 2004; pp. 252-261.

G. Plett; Extended Kalman Filtering for Battery Managements System of LiPB-based HEV Battery Packs—Part 2 Background; Journal of Power Sources 134; 2004; pp. 262-276.

G. Plett; Extended Kalman Filtering for Battery Managements System of LiPB-based HEV Battery Packs—Part 3 Background; Journal of Power Sources 134; 2004; pp. 277-283.

G. Plett; Kalman-Filter SOC Estimation for LiPB HEV Cells; The 19th International Battery, Hybrid and Fuel Electric Vehicle Symposium and Exhibition; Oct. 19-23, 2002; Busan, Korea; pp. 1-12.

G. Plett; LiPB Dynamic Cell Models for Kalman-Filter SOC Estimation; The 19th International Battery, Hybrid and Fuel Electric Vehicle Symposium and Exhibition; Oct. 19-23, 2002; Busan, Korea; pp. 1-12.

S.C. Rutan; Recursive Parameter Estimation; 1990; Journal of Chemometrics; vol. 4; pp. 103-121.

P. Maybeck; Stochastic models, estimation and control, vol. 1; 1979; Academic Press Inc., 32 pp.

T. Hansen, C.J. Wang; Support vector based battery state of charge estimator; Journal of Power Sources, 2004; 6391; pp. 1-8.

V. Johnson et al.; Temperature-Dependent Battery Models for High-Power Lithium-Ion Batteries; Jan. 2001; NREL/CP-540-28716; 17th Annual Electric Vehicle Symposium Oct. 15-18, 2000.

U.S. Appl. No. 12/819,617, filed on Jun. 21, 2010 entitled Voltage Management Methods and Systems for Performing Analog-to-Digital Conversions.

U.S. Appl. No. 12/822,285, filed on Jun. 24, 2010 entitled Battery Management System and Method for Transferring Data within the Battery Management System.

U.S. Appl. No. 12/870,940, filed on Aug. 30, 2010 entitled Systems and Methods for Determining a Warranty Obligation of a Supplier to an Original Equipment Manufacturer for a Vehicle Battery Pack.

U.S. Appl. No. 13/093,187, filed on Apr. 25, 2011 entitled Battery System and Method for Increasing an Operational Life of a Battery Cell.

* cited by examiner

HEATING SYSTEM FOR A BATTERY MODULE AND METHOD OF HEATING THE BATTERY MODULE

BACKGROUND

When electric vehicle batteries have relatively cold internal temperatures, an amount of electrical power that can be supplied by the batteries can be lower than a desired electrical power level.

The inventor herein has recognized a need for an improved heating system for a battery module and a method of heating the battery module to reduce and/or eliminate the above-mentioned deficiency.

SUMMARY

A heating system for a battery module in accordance with an exemplary embodiment is provided. The battery module has first and second battery cell groups. The heating system includes a first resistor configured to be electrically coupled to the first battery cell group when a first switch has a first operational position. The heating system further includes a second resistor configured to be electrically coupled to the second battery cell group when a second switch has a first operational position. The heating system further includes a temperature sensor configured to generate a temperature signal indicative of a temperature level of at least one of the first battery cell group and the second battery cell group. The computer is further configured to determine if the temperature signal indicates that the temperature level is less than a threshold temperature level. If the temperature level is less than the threshold temperature level, then the computer is further configured to generate first and second control signals to induce the first and second switches, respectively, to each have the first operational position to at least partially discharge the first and second battery cell groups, respectively, through the first and second resistors, respectively, to generate heat energy in the first and second resistors. Further, the computer is configured to generate a third control signal to turn on a fan to distribute the heat energy in the battery module to increase the temperature level of the battery module.

A method for heating a battery module in accordance with another exemplary embodiment is provided. The battery module has first and second battery cell groups. The method includes generating a temperature signal indicative of a temperature level of at least one of the first battery cell group and the second battery cell group utilizing a temperature sensor. The method further includes determining if the temperature signal indicates that the temperature level is less than a threshold temperature level utilizing a computer. If the temperature level is less than the threshold temperature level, then the method further includes generating first and second control signals to induce first and second switches, respectively, to each have a first operational position to at least partially discharge the first and second battery cell groups, respectively, through first and second resistors, respectively, to generate heat energy in the first and second resistors, utilizing the computer. Further, the method includes generating a third control signal to turn on a fan to distribute the heat energy in the battery module to increase the temperature level of the battery module utilizing the computer.

DETAILED DESCRIPTION

Figure 1:
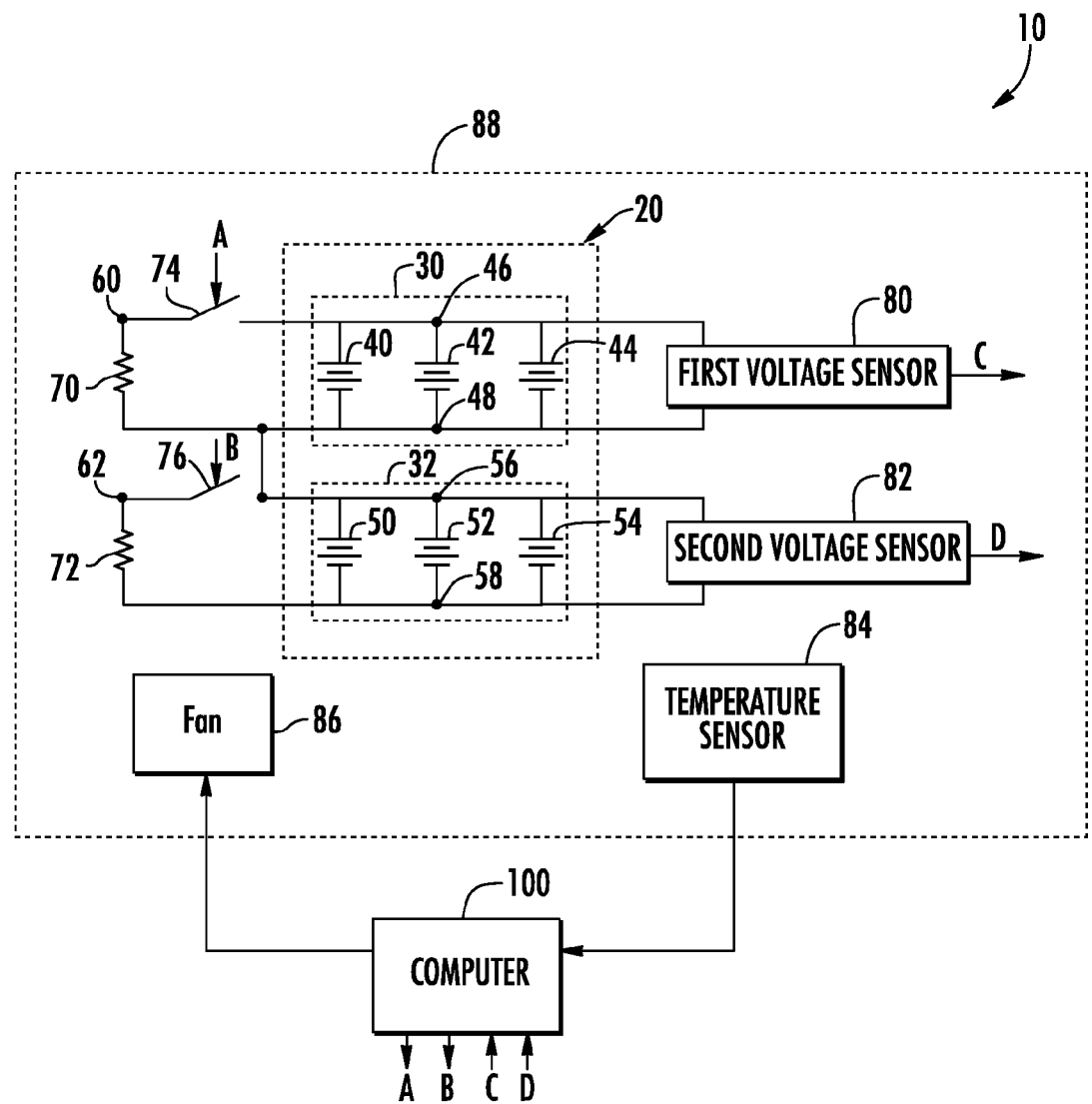
FIG. 1 is a schematic of a heating system for a battery module in accordance with an exemplary embodiment.

Referring to FIG. 1, a heating system 10 for heating a battery module 20, in accordance with an exemplary embodiment is provided. An advantage of the heating system 10 is that the system utilizes balancing resistors for generating heat energy to increase a temperature level of the battery module 20 greater than or equal to a threshold temperature level. For purposes of understanding, the term "electrically balanced" means that two or more battery cells (or two or more battery cell groups) have substantially equal output voltages or substantially equal state-of-charges. A state of charge of a battery cell group can be determined utilizing the following equation: state-of-charge=f(output voltage, temperature level of battery cell group). It should be noted that an output voltage of a battery cell group corresponds to an output voltage of a battery cell in the battery cell group. Also, a temperature level of a battery cell group corresponds to a temperature level of a battery cell in the battery cell group. The term "resistor" means one or more electrical components that dissipate electrical power through an internal impedance. For example, a resistor could comprise at least one of a carbon-based electrically resistive component, a wire-bound electrically resistive component, and a heating coil.

The battery module 20 includes a first battery cell group 30 and a second battery cell group 32. The first battery cell group 30 includes battery cells 40, 42, 44 that are electrically coupled in parallel to one another between nodes 46 and 48. In an alternative embodiment, the first battery cell group 30 could have less than three battery cells or greater than three battery cells electrically coupled in parallel therein. In one exemplary embodiment, the battery cells 40, 42, 44 are lithium-ion pouch type battery cells. Of course, in an alternative embodiment, the battery cells 40, 42, 44 could be other types of battery cells known to those skilled in the art. The second battery cell group 32 includes battery cells 50, 52, 54 that are electrically coupled in parallel to one another between nodes 56, 58. In an alternative embodiment, the second battery cell group 32 could have less than three battery cells or greater than three battery cells electrically coupled in parallel therein. In one exemplary embodiment, the battery cells 50, 52, 54 are lithium-ion pouch-type battery cells. Of course, in an alternative embodiment, the battery cells 50, 52, 54 could be other types of battery cells known to those skilled in the art.

The heating system 10 is provided to increase a temperature level of the battery module 20 when the temperature level falls below a threshold temperature level. The heating system 10 includes a first resistor 70, a second resistor 72, a first switch 74, a second switch 76, a first voltage sensor 80, and a second voltage sensor 82, a temperature sensor 84, a fan 86, a housing 88, a computer 100.

The first resistor 70 is electrically coupled between nodes 60, 48 and is electrically coupled in series with the first switch 74. The first switch 74 is further electrically coupled between the nodes 60, 46. The first resistor 70 is configured to be electrically coupled to the first battery cell group 30 when the first switch 74 has a first operational position (e.g., a closed operational position) in response to a control signal from the computer 100. When the first switch 74 has the first operational position, the first battery cell group 30 generates an electrical current that flows through the first resistor 72 to generate heat energy therein and to at least partially discharge the first battery cell group 30. The first resistor 70 is further configured to be electrically decoupled from the first battery cell group 30 when the first switch 74 has a second operational position (e.g., an open operational position) in response to the control signal no longer being supplied to the first switch 74 by the computer 100.

The second resistor 72 is electrically coupled between nodes 62, 58 and is electrically coupled in series with the second switch 76. The second switch 76 is further electrically coupled between the nodes 62, 56. The second resistor 72 is configured to be electrically coupled to the second battery cell group 32 when the second switch 76 has a first operational position (e.g., a closed operational position) in response to a control signal from the computer 100. When the second switch 76 has the first operational position, the second battery cell group 32 generates an electrical current that flows through the second resistor 72 to generate heat energy therein and to at least partially discharge the second battery cell group 32. The second resistor 72 is further configured to be electrically decoupled from the second battery cell group 32 when the second switch 76 has a second operational position (e.g., an open operational position) in response to the control signal no longer being supplied to the second switch 76 by the computer 100.

The first voltage sensor 80 is electrically coupled between the nodes 46, 48. The first voltage sensor 80 is configured to generate a first signal indicative of a first voltage level being output by the first battery cell group 30, that is received by the computer 100.

The second voltage sensor 82 is electrically coupled between the nodes 56, 58. The second voltage sensor 82 is configured to generate a second signal indicative of a second voltage level being output by the second battery cell group 32, that is received by the computer 100.

The temperature sensor 84 is disposed proximate to the first and second battery cell groups 30, 32. The temperature sensor 84 is configured to generate a temperature signal indicative of a temperature level of at least one of the first battery cell group 30 and the second battery cell group 32 that is received by the computer 100.

The fan 86 is disposed proximate to the first resistor 70 and to the second resistor 72. The fan 86 is configured to circulate air or another gas past the first and second resistors 70, 72 when the fan 86 is turned on to distribute heat energy from the resistors 70, 72 to the battery module 34 to increase a temperature level of the battery cells therein. The fan 86 is turned on by a control signal from the computer 100 and is turned off when the control signal is no longer supplied to the fan 86 by the computer 100.

The housing 88 is provided to enclose the first resistor 70, the second resistor 72, the first switch 74, the second switch 76, the first voltage sensor 80, the second voltage sensor 82, the temperature sensor 84, and the fan 86. In one exemplary embodiment, the computer 100 is disposed outside of the housing 88. Of course, in an alternative embodiment, the computer 100 may be disposed inside of the housing 88. In one exemplary embodiment, the housing 88 may be constructed of plastic. Of course, in an alternative embodiment, the housing 88 could be constructed of other materials known to those skilled in the art, such as stainless steel for example.

The computer 100 is electrically coupled to the first voltage sensor 80, the second voltage sensor 82, the temperature sensor 84, the fan 86, the first switch 74, and the second switch 76. The computer 100 has an internal memory for storing executable software instructions and associated data for implementing the method for heating the battery module 20 that will be explained in greater detail below. In one exemplary embodiment, the computer 100 comprises a microprocessor. Of course, in alternative embodiments, the computer 100 could comprise a programmable logic controller or a field programmable logic array.

Figure 2:
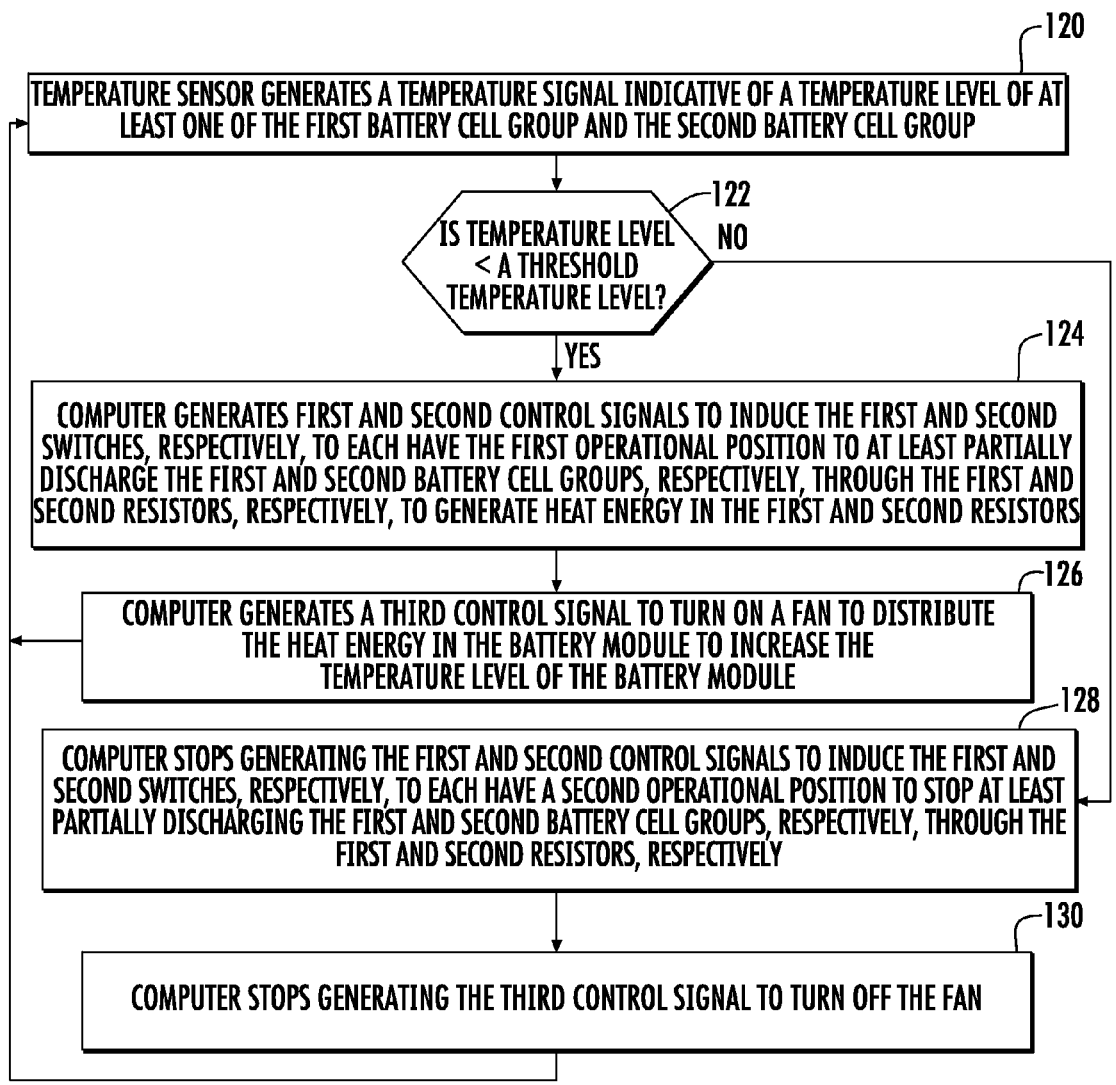
FIG. 2 is a flowchart of a method for heating a battery module in accordance with another exemplary embodiment.

Referring to FIG. 2, a flowchart of a method for heating the battery module 20 in accordance with another exemplary embodiment is provided.

At step 120, the temperature sensor 84 generates a temperature signal indicative of a temperature level of at least one of the first battery cell group 30 and the second battery cell group 32. After step 120, the method advances to step 122.

At step 122, the computer 100 makes a determination as to whether the temperature level is less than a threshold temperature level. In an exemplary embodiment, the threshold temperature level is within a temperature range of 0-10° C. In another exemplary embodiment, the threshold temperature level is 10° C. Of course, the threshold temperature level could be less than 0° C. or greater than 10° C. If the value of step 122 equals "yes", the method advances to step 124. Otherwise, the method advances to step 128.

At step 124, the computer 100 generates first and second control signals to induce the first and second switches 74, 76, respectively, to each have the first operational position to at least partially discharge the first and second battery cell groups 30, 32, respectively, through the first and second resistors 70, 72, respectively, to generate heat energy in the first and second resistors 70, 72. After step 124, the method advances to step 126.

At step 126, the computer 100 generates a third control signal to turn on the fan 86 to distribute the heat energy in the battery module 20. After step 126, the method returns to step 120.

Referring again to step 122, if the value of step 122 equals "no", the method advances to step 128. At step 128, the computer 100 stops generating the first and second control signals to induce the first and second switches 74, 76, respectively, to each have a second operational position to stop at least partially discharging the first and second battery cell groups 30, 32, respectively, through the first and second resistors 70, 72, respectively. After step 128, the method advances to step 130.

At step 130, the computer 100 stops generating the third control signal to turn off the fan 86. After step 130, the method returns to step 120.

Figure 3:
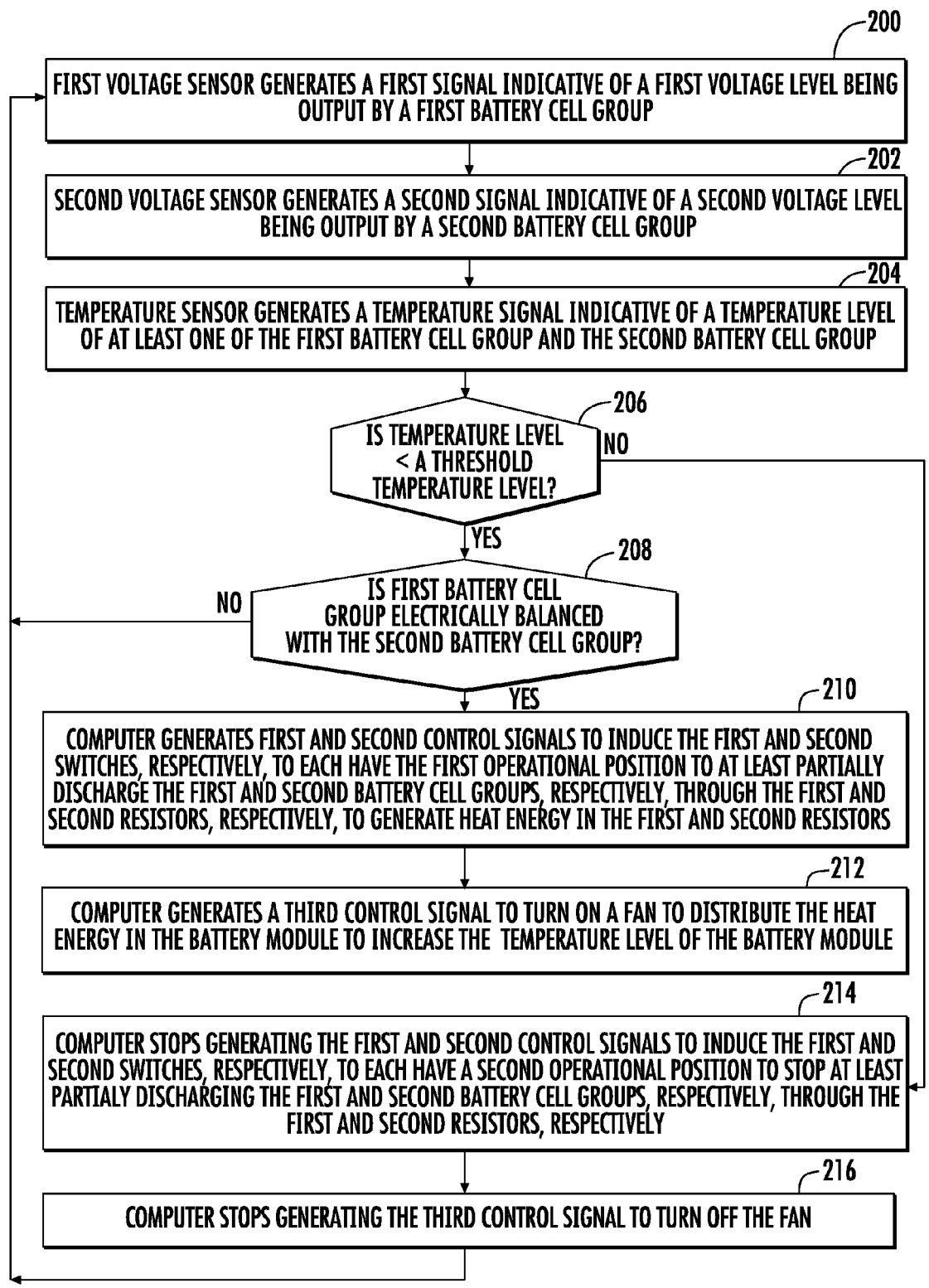
FIG. 3 is a flowchart of a method for heating a battery module in accordance with another exemplary embodiment.

Referring to FIG. 3, a method for heating the battery module 20 in accordance with another exemplary embodiment will now be explained.

At step 200, the first voltage sensor 80 generates a first signal indicative of a first voltage level being output by a first battery cell group 30. After step 200, the method advances to step 202.

At step 202, the second voltage sensor 82 generates a second signal indicative of a second voltage level being output by the second battery cell group 32. After step 202, the method advances to step 204.

At step 204, the temperature sensor 84 generates a temperature signal indicative of a temperature level of at least one of the first battery cell group 30 and the second battery cell group 32. After step 204, the method advances to step 206.

At step 206, the computer 100 makes a determination as to whether the temperature level is less than a threshold temperature level. In an exemplary embodiment, the threshold temperature level is within a temperature range of 0-10° C. In another exemplary embodiment, the threshold temperature level is 10° C. Of course, the threshold temperature level could be less than 0° C. or greater than 10° C. If the value of step 206 equals "yes", the method advances to step 208. Otherwise, the method advances to step 214.

At step 208, the computer 100 makes a determination as to whether the first battery cell group 30 is electrically balanced with the second battery cell group 32. If the value of step 208 equals "yes", the method advances to step 210. Otherwise, the method returns to step 200.

At step 210, the computer 100 generates first and second control signals to induce the first and second switches 74, 76, respectively, to each have the first operational position to at least partially discharge the first and second battery cell groups 30, 32, respectively, through the first and second resistors 70, 72, respectively, to generate heat energy in the first and second resistors 70, 72. After step 210, the method advances to step 212.

At step 212, the computer 100 generates a third control signal to turn on the fan 86 to distribute the heat energy in the battery module 20 to increase the temperature level of the battery module 20. After step 212, the method returns to step 200.

Referring again to step 206, if the value of step 206 equals "no", the method advances to step 214. At step 214, the computer 100 stops generating the first and second control signals to induce the first and second switches 74, 76, respectively, to each have a second operational position to stop at least partially discharging the first and second battery cell groups 30, 32, respectively, through the first and second resistors 70, 72, respectively. After step 214, the method advances to step 216.

At step 216, the computer 100 stops generating the third control signal to turn off the fan 86. After step 216, the method returns to step 200.

The heating system 10 for the battery module 20 and the methods for heating the battery module 20 provide a substantial advantage over other heating systems and methods. In particular, the heating system 10 and methods utilize balancing resisters in the heating system for generating heat energy to increase the temperature of the battery module greater than or equal to a threshold temperature level in the battery module 20.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A heating system for a battery module, the battery module having first and second battery cell groups, comprising:
    a first resistor configured to be electrically coupled to the first battery cell group when a first switch has a first operational position;
    a second resistor configured to be electrically coupled to the second battery cell group when a second switch has a first operational position;
    a temperature sensor configured to generate a temperature signal indicative of a temperature level of at least one of the first battery cell group and the second battery cell group;
    a first voltage sensor electrically coupled to the first battery cell group, the first voltage sensor configured to generate a first signal indicative of a first voltage level of the first battery cell group;
    a second voltage sensor electrically coupled to the second battery cell group, the second voltage sensor configured to generate a second signal indicative of a second voltage level of the second battery cell group;
    a computer being operably coupled to the first voltage sensor, the second voltage sensor, and the temperature sensor such that the computer receives the first signal, the second signal, and the temperature signal, respectively; the computer being further operably coupled of the first switch and the second switch;
    the computer being further programmed to determine if the first voltage level is substantially equal to the second voltage level;
    the computer being further programmed to generate first and second control signals to induce the first and second switches, respectively, to each have the first operational position to at least partially discharge the first and second battery cell groups, respectively, through the first and second resistors, respectively, to generate heat energy in the first and second resistors, if both the temperature level is less than a threshold temperature level, and the first voltage level is substantially equal to the second voltage level; and
    the computer being further programmed to generate a third control signal to turn on a fan to distribute the heat energy in the battery module to increase the temperature level of the battery module.

2. The heating system of claim 1, wherein
    the computer being further programmed to stop generating the first and second control signals to induce the first and second switches, respectively, to each have a second operational position to stop at least partially discharging the first and second battery cell groups, respectively, through the first and second resistors, respectively, if the temperature level is greater than or equal to the threshold temperature level.

3. The heating system of claim 2, wherein the computer being further programmed to stop generating the third control signal to turn off the fan, if the temperature level is greater than or equal to the threshold temperature level.

4. The heating system of claim 1, wherein:
    the first battery cell group is electrically coupled to and between a first node and a second node;
    the first voltage sensor being electrically coupled to and between the first node and the second node; and
    a series combination of the first resistor and the first switch being electrically coupled between the first node and the second node.

5. The heating system of claim 4, wherein:
    the second battery cell group is electrically coupled to and between the second node and a third node;
    the second voltage sensor being electrically coupled to and between the second node and the third node; and
    a series combination of the second resistor and the second switch being electrically coupled between the second node and the third node.

6. The heating system of claim 1, further comprising:
    a housing enclosing the first and second resistors, the temperature sensor, the first and second voltage sensors, and the first and second switches therein; and
    the computer being disposed outside of the housing.

7. A heating system for a battery module, the battery module having first and second battery cell groups, comprising:

a first resistor configured to be electrically coupled to the first battery cell group when a first switch has a first operational position;

a second resistor configured to be electrically coupled to the second battery cell group when a second switch has a first operational position;

a temperature sensor configured to generate a temperature signal indicative of a temperature level of at least one of the first battery cell group and the second battery cell group;

a first voltage sensor electrically coupled to the first battery cell group, the first voltage sensor configured to generate a first signal indicative of a first voltage level of the first battery cell group;

a second voltage sensor electrically coupled to the second battery cell group, the second voltage sensor configured to generate a second signal indicative of a second voltage level of the second battery cell group;

a computer being operably coupled to the first voltage sensor, the second voltage sensor, and the temperature sensor such that the computer receives the first signal, the second signal, and the temperature signal, respectively; the computer being further operably coupled of the first switch and the second switch;

the computer being further programmed to determine a first state-of-charge of the first battery cell group based on the first voltage level and the temperature level;

the computer being further programmed to determine a second state-of-charge of the second battery cell group based on the second voltage level and the temperature level;

the computer being further programmed to determine if the first state-of-charge is substantially equal to the second state-of-charge;

the computer being further programmed to generate first and second control signals to induce the first and second switches, respectively, to each have the first operational position to at least partially discharge the first and second battery cell groups, respectively, through the first and second resistors, respectively, to generate heat energy in the first and second resistors, if both the temperature level is less than a threshold temperature level, and the first state-of-charge is substantially equal to the second state-of-charge; and the computer being further programmed to generate a third control signal to turn on a fan to distribute the heat energy in the battery module to increase the temperature level of the battery module.

8. The heating system of claim 7, wherein the computer being further programmed to stop generating the first and second control signals to induce the first and second switches, respectively, to each have a second operational position to stop at least partially discharging the first and second battery cell groups, respectively, through the first and second resistors, respectively, if the temperature level is greater than or equal to the threshold temperature level.

9. The heating system of claim 8, wherein the computer being further programmed to stop generating the third control signal to turn off the fan, if the temperature level is greater than or equal to the threshold temperature level.

10. The heating system of claim 7, further comprising:
a housing enclosing the first and second resistors, the temperature sensor, the first and second voltage sensors, and the first and second switches therein; and
the computer being disposed outside of the housing.

11. The heating system of claim 7, wherein:
the first battery cell group is electrically coupled to and between a first node and a second node;
the first voltage sensor being electrically coupled to and between the first node and the second node; and
a series combination of the first resistor and the first switch being electrically coupled between the first node and the second node.

12. The heating system of claim 11, wherein:
the second battery cell group is electrically coupled to and between the second node and a third node;
the second voltage sensor being electrically coupled to and between the second node and the third node; and
a series combination of the second resistor and the second switch being electrically coupled between the second node and the third node.

* * * * *